US012783196B2

(12) United States Patent
Imai

(10) Patent No.: US 12,783,196 B2
(45) Date of Patent: Nov. 3, 2026

(54) IMAGE PROCESSING APPARATUS, SYSTEM, AND CONTROL METHOD

(71) Applicant: SHARP KABUSHIKI KAISHA, Sakai City (JP)

(72) Inventor: Hidemitsu Imai, Sakai City (JP)

(73) Assignee: SHARP KABUSHIKI KAISHA, Sakai City (JP)

( * ) Notice: Subject to any disclaimer, the term of this patent is extended or adjusted under 35 U.S.C. 154(b) by 0 days.

(21) Appl. No.: 19/241,505

(22) Filed: Jun. 18, 2025

(65) Prior Publication Data

US 2026/0003555 A1 Jan. 1, 2026

(30) Foreign Application Priority Data

Jun. 26, 2024 (JP) ................................ 2024-103193

(51) Int. Cl.
*G06F 3/14* (2006.01)

(52) U.S. Cl.
CPC .................................... *G06F 3/14* (2013.01)

(58) Field of Classification Search
CPC ........................................................ G06F 3/14
See application file for complete search history.

(56) References Cited

U.S. PATENT DOCUMENTS

2017/0034768 A1 2/2017 Kimura
2022/0312514 A1* 9/2022 Ichieda ................. H04W 76/14
2024/0331426 A1* 10/2024 Agrawal ........... G06V 30/2247

FOREIGN PATENT DOCUMENTS

JP 2017-034380 A 2/2017

* cited by examiner

*Primary Examiner* — Peter D McLoone
(74) *Attorney, Agent, or Firm* — ScienBiziP, P.C.

(57) ABSTRACT

An image processing apparatus that generates connection information for a connection to an access point as a code image that is readable by a terminal device includes a display that displays the generated code image, and one or more controllers that control display of the code image on the display, in which the one or more controllers display, on the display, a first code image including connection information for the terminal device to connect to the image processing apparatus serving as an access point and a second code image including connection information for the terminal device to connect to an access point other than the image processing apparatus, regardless of whether the function of the image processing apparatus as an access point is enabled or disabled.

8 Claims, 17 Drawing Sheets

D10

| CONNECTION SETTING (MAIN BODY) / CONNECTION SETTING (APPLICATION) | WIRED CONNECTION ONLY | WIRED + AP MODE | EXTERNAL AP MODE |
|---|---|---|---|
| CONNECTION TO MAIN DEVICE | NON-DISPLAY (ERROR DISPLAY) | QR CODE DISPLAY FOR CONNECTION TO MAIN DEVICE AP | NON-DISPLAY (ERROR DISPLAY) |
| CONNECTION TO EXTERNAL AP | QR CODE DISPLAY FOR CONNECTION TO EXTERNAL AP | QR CODE DISPLAY FOR CONNECTION TO EXTERNAL AP | QR CODE DISPLAY FOR CONNECTION TO EXTERNAL AP |

FIG. 15

IMAGE PROCESSING APPARATUS, SYSTEM, AND CONTROL METHOD

CROSS-REFERENCE TO RELATED APPLICATION

The present application claims priority from Japanese Application JP2024-103193, the content of which is hereby incorporated by reference into this application.

BACKGROUND OF THE INVENTION

1. Field of the Invention

The disclosure relates to an image processing apparatus, a system, and a control method.

2. Description of the Related Art

For example, it is known as related art that a communication device capable of operating in an access point mode generates a first two-dimensional code including address information of the communication device and identification information of the access point and a second two-dimensional code including the address information of the communication device and not including the identification information of the access point, and does not output the first two-dimensional code when the access point mode is set to be disabled.

SUMMARY OF THE INVENTION

The disclosure is to provide an image processing apparatus, a system, and a control method that enable the user operability with respect to acquisition of connection information for a connection to an access point to improve.

To solve the above-described problem, an image processing apparatus according to the disclosure is an image processing apparatus that generates connection information for a connection to an access point as a code image that is readable by a terminal device, the image processing apparatus including a display that displays the generated code image and one or more controllers that control display of the code image on the display, in which the one or more controllers display, on the display, a first code image including connection information for the terminal device to connect to the image processing apparatus serving as an access point and a second code image including connection information for the terminal device to connect to an access point other than the image processing apparatus, regardless of whether the function of the image processing apparatus as an access point is enabled or disabled.

In addition, a system according to the disclosure is a system including an image processing apparatus, and a terminal device capable of connecting to the image processing apparatus via an access point, in which the image processing apparatus includes a generator that generates connection information for a connection to the access point as a code image, a display that displays the generated code image, and one or more controllers that control display of the code image on the display, the one or more controllers display, on the display, a first code image including connection information for the terminal device to connect to the image processing apparatus serving as an access point and a second code image including connection information for the terminal device to connect to an access point other than the image processing apparatus, regardless of whether the function of the image processing apparatus as an access point is enabled or disabled, the terminal device includes a connection controller that reads the code image displayed on the display and connects to the access point, based on the decoded connection information, and the connection controller stores the decoded connection information regardless of whether a connection to the access point based on the first code image or the second code image is successful.

In addition, a control method according the disclosure includes generating connection information for a connection to an access point as a code image that is readable by a terminal device, displaying the generated code image, and controlling display of the code image, in which a first code image including connection information for the terminal device to connect to an image processing apparatus serving as an access point and a second code image including connection information for the terminal device to connect to an access point other than the image processing apparatus are displayed regardless of whether the function of the image processing apparatus as an access point is enabled or disabled.

According to the disclosure, it is possible to provide an image processing apparatus, a system, and a control method that enable user operability with respect to acquisition of connection information for a connection to an access point to improve.

BRIEF DESCRIPTION OF THE DRAWINGS

FIG. 15 is a table for explaining connection settings.

DETAILED DESCRIPTION OF THE INVENTION

In order to establish a wireless connection between an image processing apparatus or a network device such as an access point having a function of constructing a network in a wireless manner (Wi-Fi (trade name)) (hereinafter referred to as an "access point function") and a terminal device such as a smartphone or a personal computer (PC) having a wireless local area network (LAN) function, a user is generally required to directly input connection information related to the access point such as a service set identifier (SSID), an encryption type, and a password (security key) to the terminal device or select an access point desired to connect from a list of access points found and input necessary connection information.

Figure 13:
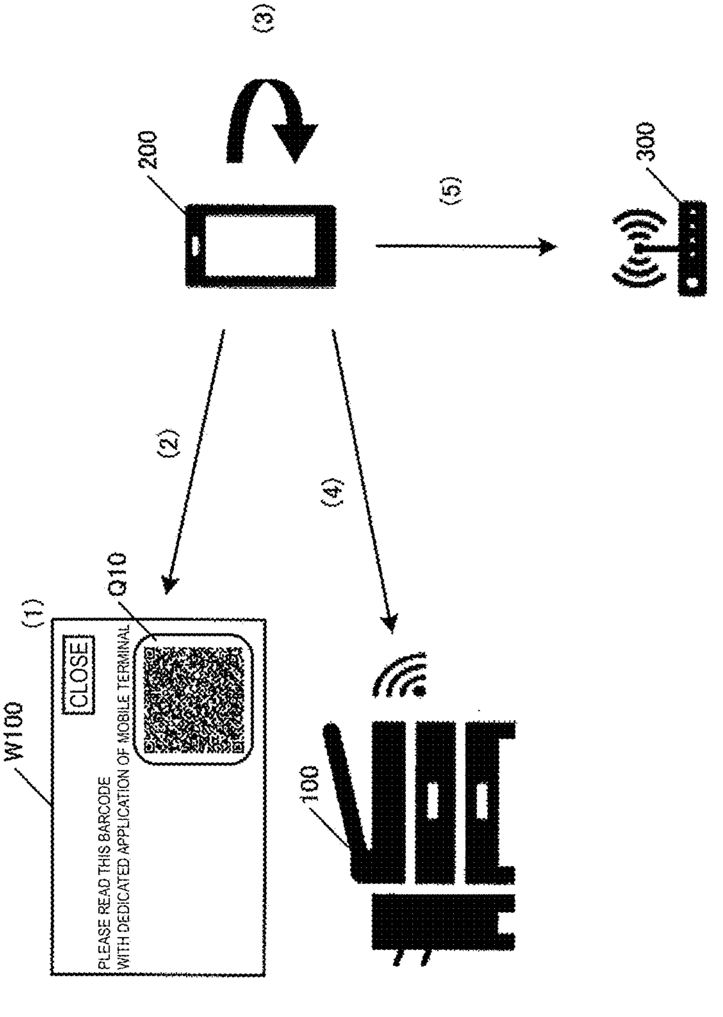
FIG. 13 is a diagram for describing a connection method of wireless connection to be established between a multifunction peripheral, a terminal device, and an access point.

For example, the connection method illustrated in FIG. 13 is known as one of techniques for reducing time and effort required for such a wireless connection.

FIG. 13 is a diagram for describing a connection method for a wireless connection to be established between a multifunction peripheral 100 as an image processing apparatus having the access point function, a terminal device 200 having the wireless LAN function, and an access point 300.

First, the multifunction peripheral 100 displays a code image Q10 (in the example of FIG. 13, a two-dimensional code (e.g., a QR code (trade name))) obtained by encoding connection information such as the SSID related to the multifunction peripheral 100 set as an access point or another access point (the access point 300), the name of the SSID, the encryption type, and the password (security key) on an operation screen W100 of the multifunction peripheral 100 ((1) in the drawing).

The terminal device 200 having read the code image displayed on the operation screen W100 ((2) in the drawing) decodes and analyzes the code image to acquire the connection information for a connection to the access point set in the multifunction peripheral 100 ((3) in the drawing).

Then, based on the acquired connection information, the terminal device 200 is wirelessly connected to the multifunction peripheral 100 when the access point is set to the multifunction peripheral 100 ((4) in the drawing), or is wirelessly connected to the access point 300 when the access point is set to the access point 300 ((5) in the drawing).

In the connection method illustrated in FIG. 13, because the user does not need to directly input the connection information to the terminal device or select the access point that the user desires to connect to from the list of access points found, a wireless connection can be easily established.

Figure 14:
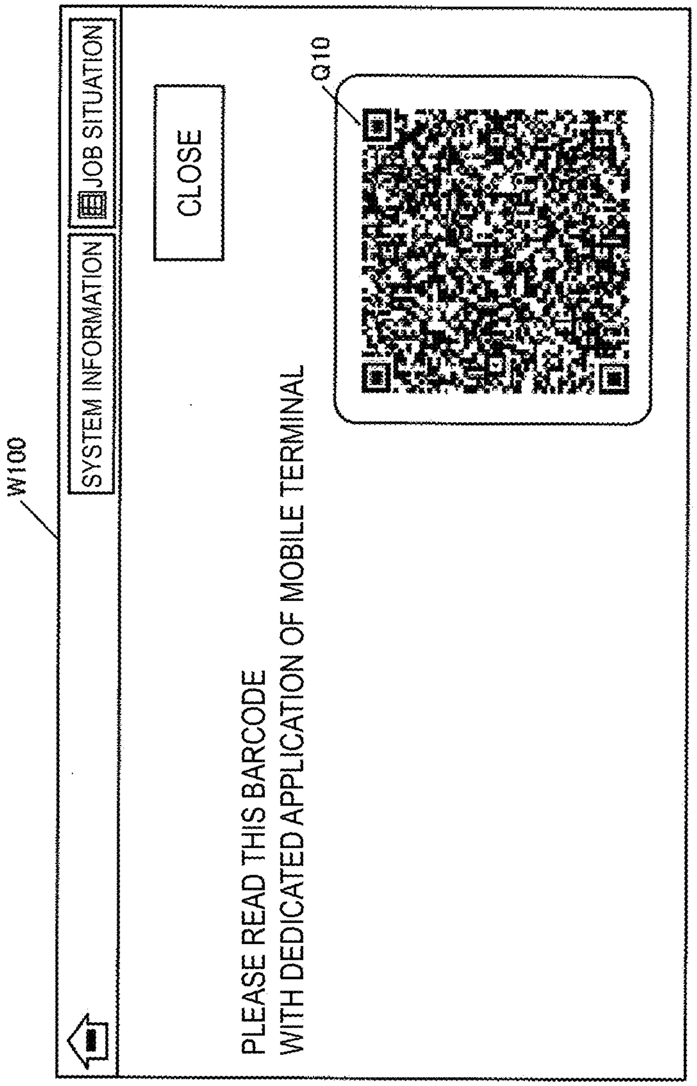
FIG. 14 is a diagram for describing an example of a display configuration of an operation screen displaying a code image.

However, only one type of code image Q10 is displayed on the operation screen W100 of the multifunction peripheral 100 as a code image corresponding to the access point in the related art as illustrated in FIG. 14. That is, while only a code image obtained by encoding the connection information related to the multifunction peripheral 100 as an access point is displayed when the multifunction peripheral 100 is set as an access point, only a code image obtained by encoding the connection information related to another access point (the access point 300) is displayed when the other access point is set as an access point.

Here, a case in which there is a discrepancy between connection settings with respect to the main body of the multifunction peripheral 100 and connection settings with respect to an application for generating a code image (hereinafter, simply referred to as an "application") is considered. FIG. 15 is a table for explaining a relationship between connection settings with respect to the main body (connection settings (main body)) of the multifunction peripheral 100 and connection settings with respect to an application (connection settings (application)).

For example, a case in which one of three types of connection settings including "wired connection only", "wired+access point (AP) mode", and "external AP mode" can be adopted as a connection setting with respect to the main body of the multifunction peripheral 100 (connection setting (main body)), one of "connection to the main device" and "connection to the external AP" can be adopted as a connection setting with respect to an application (connection setting (application)), and the connection setting (application) is prioritized for the generation (display) of a code image will be described.

When the connection setting (main body) is "wired connection only" and the connection setting (application) is "connection to the main device" as illustrated in FIG. 15, only the wired connection is enabled and the AP mode is disabled in the multifunction peripheral 100. Thus, the code image indicating the multifunction peripheral 100 as an access point is not displayed on the operation screen W100, and error display is performed.

Likewise, when the connection setting (main body) is "external AP mode" and the connection setting (application) is "connection to the main device", the code image indicating the multifunction peripheral 100 as an access point is not displayed on the operation screen W100 and error display is performed because the connection setting (main body) is "external AP mode" even though the connection setting (application) is "connection to the main device".

On the other hand, when the connection setting (main body) is "wired+AP mode" and the connection setting (application) is "connection to the main device", the wired connection and the AP mode are enabled in the multifunction peripheral 100. In this case, according to the code image indicating the multifunction peripheral 100 as an access point, the code image indicating the multifunction peripheral 100 as an access point is displayed on the operation screen W100, and the terminal device 200 can read the code image.

When the connection setting (application) is "connection to the external AP", the multifunction peripheral 100 can display a code image indicating the access point 300 as another access point on the operation screen W100 regardless of the settings of the device main body.

Figure 16:
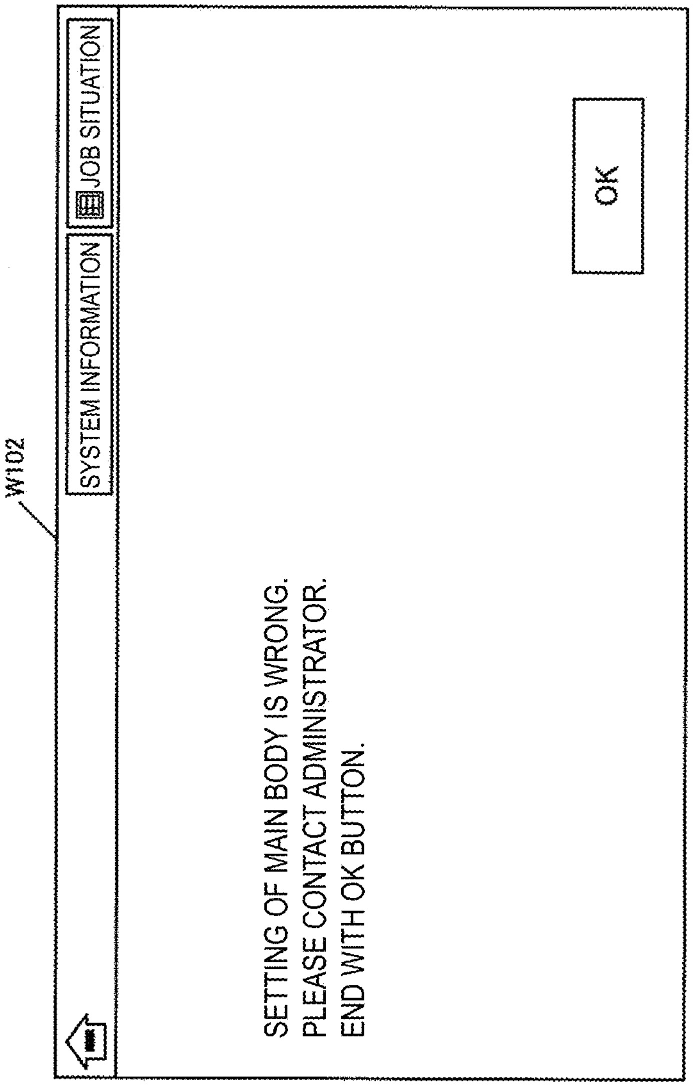
FIG. 16 is a diagram for describing an example of a display configuration of an error notification screen.

When there is a discrepancy between the connection setting (main body) and the connection setting (application) as described above, for example, the code image corresponding to the access point is not displayed, and an error screen W102 notifying the administrator of the details of the error is displayed as illustrated in FIG. 16. Thus, the administrator needs to confirm and re-set the settings for the main body of the multifunction peripheral 100, which takes time and effort and degrades operability.

An image processing apparatus according to the disclosure for solving the above-described problems will be described in the following embodiments with reference to the drawings. Note that the disclosure set forth in the claims will be described in the embodiments below as an example, and the technical scope of the disclosure is not limited to the following description of embodiments.

1 First Embodiment

1.1 Overall Configuration

Figure 1:
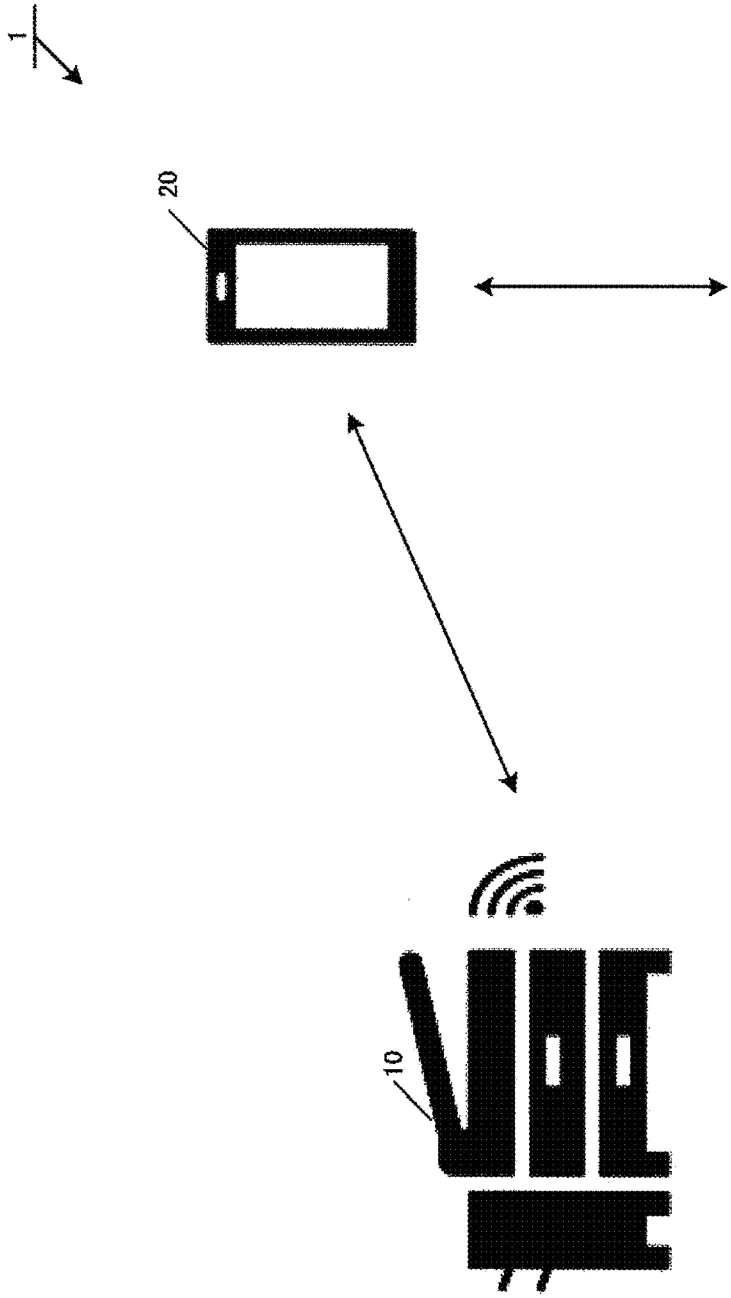
FIG. 1 is a diagram for describing a system configuration according to a first embodiment.

FIG. 1 is a diagram for describing an example of a configuration of a system 1 including a multifunction peripheral 10 as an image processing apparatus according to a first embodiment, a terminal device 20, and an access point 30. The multifunction peripheral 10 is an example of an image processing apparatus that can execute various kinds of jobs such as printing, copying, faxing, and image transmitting in one housing. The image processing apparatus according to the disclosure is not limited to the multifunction peripheral 10, and may be an image processing apparatus specialized in a specific function such as a printer or a facsimile, for example, as long as the device can realize the function as an access point and be wirelessly connected to another device such as the terminal device 20. The multifunction peripheral 10 may be connected to a network, not illustrated, for example, the Internet via a network device such as a router, not illustrated, by wired connection, and the number of devices connected is not limited.

The terminal device 20 is an information processing terminal that operates under control of a specific operating system (OS), and is not particularly limited as long as it can be wirelessly connected to other devices (the multifunction peripheral 10 and the access point 30) by using a wireless LAN function, such as a notebook computer, a smartphone, a tablet, and a mobile phone, and the number of devices connected is not particularly limited.

The access point 30 is a network device capable of transmitting and receiving wireless (Wi-Fi (trade name)) radio waves. Examples of the access point 30 include a Wi-Fi (trade name) access point, a Wi-Fi (trade name) router, and a mobile Wi-Fi (trade name) router, and the number of devices connected is not limited. The access point 30 connects the wirelessly connected terminal device 20 or the like to a network, not illustrated, for example, the Internet, via a router (a router function when the access point 30 is a Wi-Fi (trade name) router).

1.2 Regarding Multifunction Peripheral 10

1.2.1 Functional Configuration of Multifunction Peripheral 10

Figure 2:
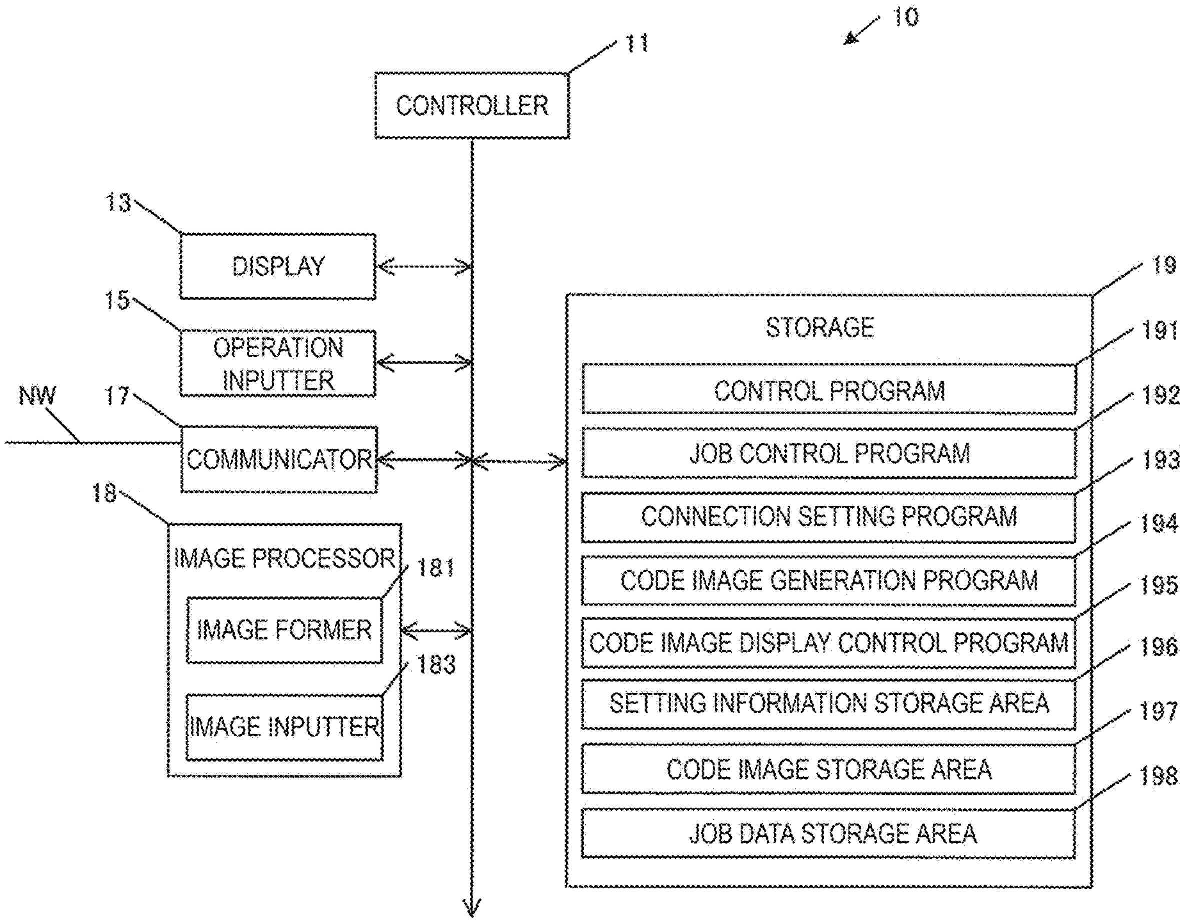
FIG. 2 is a diagram for describing a functional configuration of a multifunction peripheral according to the first embodiment.

A functional configuration of the multifunction peripheral 10 will be described with reference to FIG. 2. The multifunction peripheral 10 includes a controller 11, a display 13, an operation inputter 15, a communicator 17, an image processor 18, and a storage 19.

The controller 11 controls the entire multifunction peripheral 10. The controller 11 consists of, for example, one or more arithmetic devices (central processing unit (CPU), system on a chip (SoC), or the like). The controller 11 realizes its functions by reading and executing various programs stored in the storage 19.

The display 13 is a display device that displays various pieces of information to the user or the like. The display 13 can be constituted by, for example, a liquid crystal display (LCD) or an organic electro-luminescence (EL) display.

The operation inputter 15 is an input device that receives information input by the user or the like. The operation inputter 15 can consist of, for example, various input devices such as operation keys (for example, hardware keys and software keys) and buttons. The operation inputter 15 can be configured as a touch panel that enables input via the display 13. In this case, as an input method for the touch panel, for example, a general method such as a resistance film method, an infrared beam method, an electromagnetic induction method, or an electrostatic capacitance method can be employed.

The communicator 17 includes one or both of a wireless (Wi-Fi (trade name)) interface and a wired interface for communicating with other devices (such as the terminal device 20 and a router, not illustrated). The communicator 17 can also function as an access point capable of wirelessly connecting to the terminal device 20 based on the connection setting for the main body of the multifunction peripheral 10. The communicator 17 may include an interface related to a (short-range) wireless communication technology such as Bluetooth (trade name), near field communication (NFC), ZigBee (trade name), Infrared Data Association (IrDA), or a wireless USB.

The image processor 18 includes an image former 181 and an image inputter 183. The image former 181 feeds paper from the feed tray, not illustrated, forms an image based on image data on the paper, and then discharges the paper to a paper discharger. The image former 181 can be configured by, for example, a laser printer that employs electrophotography.

The image inputter 183 generates image information by scanning a document. The image inputter 183 can be configured as a scanner that is provided with an image sensor, for example, a charge coupled device (CCD) or a contact image sensor (CIS) and includes an automatic document feeder (ADF), a flatbed on which documents are placed to be read, and the like. There is no particular limitation on a configuration of the image inputter 183 as long as the image inputter generates image information by reading a reflected light image from a document image with an image sensor. The image inputter 183 also can be configured as an interface that can acquire, for example, document information stored in a portable storage medium such as a Universal Serial Bus (USB) memory and image information included in a print job transmitted from the terminal device 20.

The storage 19 is one or more storage devices that store various programs and various pieces of data required for operations of the multifunction peripheral 10. The storage 19 may be constituted by, for example, a storage device such as a random access memory (RAM), a hard disk drive (HDD), a solid state drive (SSD), or a read only memory (ROM).

In the first embodiment, the storage 19 stores a control program 191, a job control program 192, a connection setting program 193, a code image generation program 194, and a code image display control program 195, and allocates a setting information storage area 196, a code image storage area 197, and a job data storage area 198.

The control program 191 is a program that the controller 11 reads after the device starts. The controller 11 having read the control program 191 functions as an OS to control driving of hardware such as the display 13, the operation inputter 15, the communicator 17, and the image processor 18.

The job control program 192 is a program that the controller 11 reads when executing a print job related to printing, copying, or the like, or a transmission job related to transmitting image data (transmission data) to be transmitted based on SMB or FTP. The controller 11 having read the job control program 192 changes the device mode to a job mode for executing each job, and then executes various jobs. To execute a job, the controller 11 can display, on the display 13, a job setting screen as an operation screen that receives selection of setting values or functions required for execution of the job from the user, as necessary. The controller 11 can execute the job, based on the setting values or functions received through the job setting screen.

The connection setting program 193 is a program that the controller 11 reads when receiving a connection setting for the main body of the multifunction peripheral 10 from the user. The controller 11 having read the connection setting program 193 sets the connection setting for the main body of the multifunction peripheral 10 to one of “wired connection only”, “wired+AP mode”, and “external AP mode” based on the setting by the user. Here, “wired connection only" is a connection setting in which communication with another device is performed in wired connection only via a LAN cable or the like.

"wired+AP mode" is a connection setting for causing the main body of the multifunction peripheral 10 to function as an access point, in addition to the wired connection described above. When the main body of the multifunction peripheral 10 functions as an access point, the controller 11 reads a code image generation program 194 to be described below to generate a code image obtained by encoding connection information (an SSID for setting the multifunction peripheral 10 as an access point, the name of the SSID, an encryption type, a security key (password), etc.) as a first code image, based on the connection information received from a user via a connection information input screen, not illustrated, or set as a default initial setting.

"External AP mode" is a connection setting for causing the access point 30 other than the multifunction peripheral 10 to function as an (external) access point. When the access point 30 is caused to function as an access point, the controller 11 reads the code image generation program 194 to be described below to generate a code image obtained by encoding connection information for connecting to the access point 30 (an SSID for setting the access point 30 as an access point, the name of the SSID, an encryption type, a security key (password), etc.) as a second code image, based on the connection information.

The controller 11 having read the connection setting program 193 receives, from the user, a connection setting ("connection to the main device" or "connection to the external AP") in the application related to the generation of the code image. The controller 11 stores the connection setting received from the user and the connection information in the setting information storage area 196.

The code image generation program 194 is a program that is read out by the controller 11 when generating a code image based on connection information. The controller 11 having read the code image generation program 192 generates a code image by encoding connection information into a first-dimensional code such as a barcode (e.g., EAN code, JAN code Codbar, CODE 28, etc.), a stack-type two-dimensional code (e.g., PDF417, CODE49, etc.), or a matrix-type two-dimensional code (e.g., a quick response code (QR code (trade name)), DataMatrix, VeriCode, Aztec, etc.). In the following description, a quick response code (QR code (trade name)) will be described as an example of a code image. In the disclosure, regardless of whether the function of the multifunction peripheral 10 as an access point is enabled or disabled, the controller 11 generates a first code image including connection information for the terminal device 20 to connect to the multifunction peripheral 10 as an access point and a second code image including connection information for the terminal device 20 to connect to an access point other than the multifunction peripheral 10. These code images may be generated by an external device, which is not illustrated, such as a server.

The code image display control program 195 is a program read by the controller 11 when controlling display of a generated code image. The controller 11 having read the code image display control program 195 performs control to display the first code image and the second code image in a distinguishable manner according to the access point set as a connection destination of the terminal device 20. The distinguishable display of the first code image and the second code image will be described below.

The setting information storage area 196 is a storage area that stores various types of setting information for the multifunction peripheral 10 to operate as an image processing apparatus, in addition to the connection setting received from the user and the connection information.

The code image storage area 197 is a storage area that stores code images generated by the controller 11 that has read the code image generation program 194.

The job data storage area 198 is a storage area that stores job data (e.g., scanned data, etc.) generated by executing each job as final products. Note that the job data storage area 198 may store not only deliverables but also intermediates (e.g., image data before OCR processing, various image processing, and encryption processing) generated in the process of executing each job. The job data stored in the job data storage area 198 is not limited to the data format or form as long as it is savable as an intermediate or a deliverable.

1.3 Regarding Terminal Device 20

1.3.1 Functional Configuration of Terminal Device 20

Figure 3:
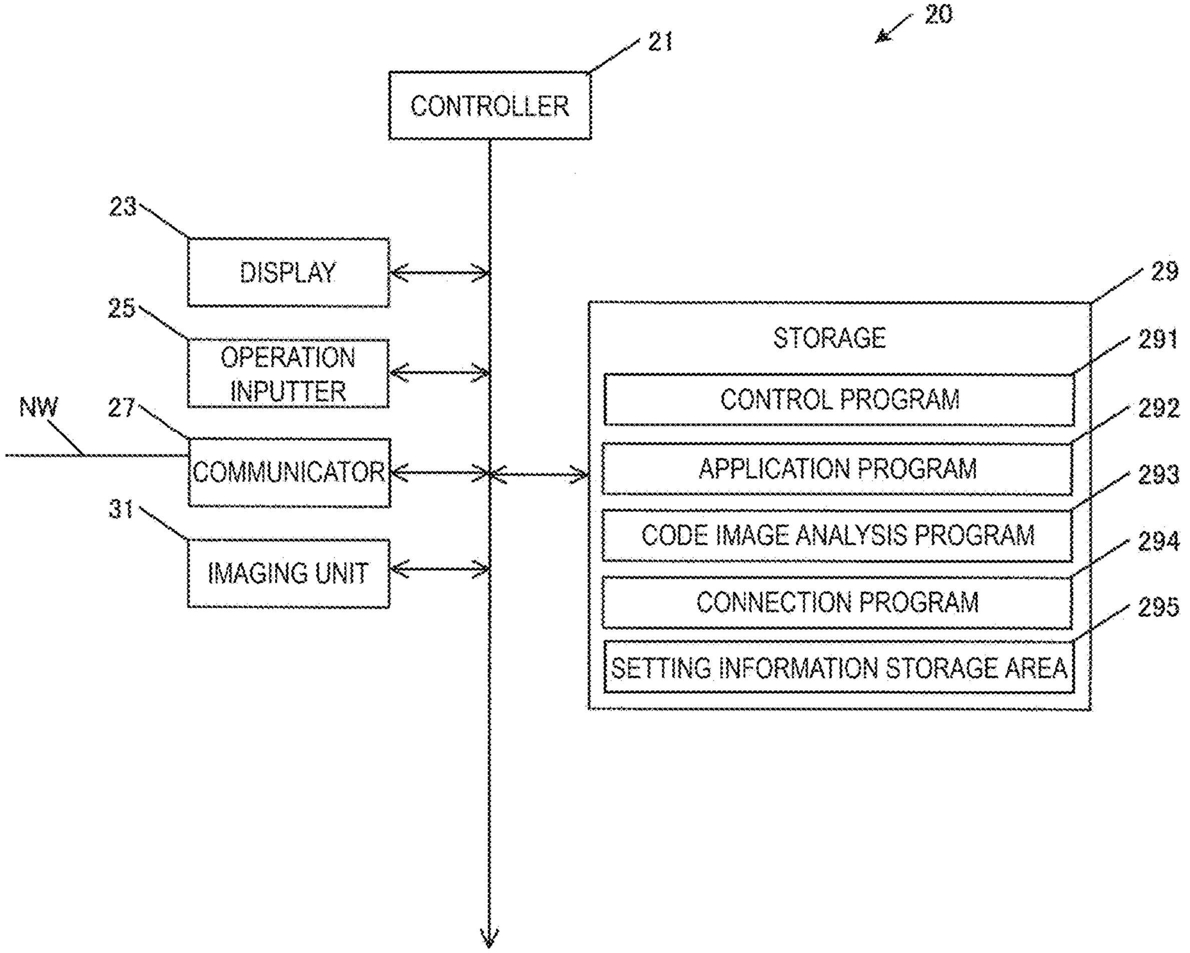
FIG. 3 is a diagram for describing a functional configuration of a terminal device according to the first embodiment.

Next, a functional configuration of the terminal device 20 will be described with reference to FIG. 3. The terminal device 20 includes a controller 21, a display 23, an operation inputter 25, a communicator 27, a storage 29, and an imaging unit 31.

The controller 21 controls the entire terminal device 20. The controller 21 consists of, for example, one or more arithmetic devices (central processing unit (CPU), system on a chip (SoC), etc.). The controller 21 realizes its functions by reading and executing various programs stored in the storage 29.

The display 23 is a display device that displays various pieces of information to the user. The display 23 can consist of, for example, an LCD, an organic EL display, or the like.

The operation inputter 25 is an input device that receives information from the user or the like. For the operation inputter 25, an input device, for example, a touch panel that enables input via the display 23, a keyboard, a mouse, or the like can be used.

The communicator 27 includes one or both of a wireless (Wi-Fi (trade name)) interface and a wired interface for communicating with other devices (the multifunction peripheral 10, the access point 30, etc.). The communicator 17 may include an interface related to a (short-range) wireless communication technology, for example, Bluetooth (trade name), near field communication (NFC), ZigBee (trade name), Infrared Data Association (IrDA), a wireless USB, etc.

The storage 29 is one or more storage devices that store various types of program and various types of data necessary for operations of the terminal device 20. The storage 29 can be configured by a storage device, for example, a RAM, an HDD, an SSD, a ROM, etc.

In the first embodiment, the storage 29 stores a control program 291, an application program 292, a code image analysis program 293, and a connection program 294, and allocates a setting information storage area 295.

The control program 291 is a program that the controller 21 reads after activation of the device. The controller 21 having read the control program 291 functions as an OS to control driving of hardware such as the display 23, the operation inputter 25, the communicator 27, and the imaging unit 31.

The application program 292 is a program that the controller 21 reads upon reception of an activation instruction from the user. The controller 21 having read the application program 292 provides a specific function corresponding to the user's purpose, such as document creation, graphic rendering, and Internet browsing. The application program 292 according to the disclosure may include a dedicated application program capable of connecting to the multifunction peripheral 10 and remotely operating the multifunction peripheral 10. The controller 21 having read the dedicated application program functions as a dedicated application and cooperates with the connection program 294 to connect to the multifunction peripheral 10 via the access point set in the multifunction peripheral 10 to operate multifunction peripheral 10. For example, the controller 21 can acquire image information generated based on document read by the multifunction peripheral 10 through wireless communication and store the image information in the storage 29.

The code image analysis program 293 is a program that is to be read by the controller 21 to decode the code image acquired by the imaging unit 31. The controller 21 having read the code image analysis program 293 analyzes connection information for connecting to the access point set in the multifunction peripheral 10, based on the decoding result of the code image.

The connection program 294 is a program that is to be read by the controller 21 to wirelessly connect to an access point. The controller 21 having read the connection program 294 functions as a connection controller, and performs wireless connection to the access point, based on the connection information of the access point analyzed by the code image analysis program 293.

The setting information storage area 295 is a storage area that stores various kinds of setting information for operating the terminal device 20 in addition to the connection information related to the access point acquired based on the analysis result of the code image.

The imaging unit 31 is an imaging device that captures a code image displayed on the operation screen of the multifunction peripheral 10, which is a so-called camera. The imaging unit 31 may include one or more imaging devices. The imaging unit 31 outputs the captured image as an image signal. The imaging unit 31 may also output one or more images as a continuous video.

1.4 Regarding Access Point 30

1.4.1 Functional Configuration of Access Point 30

As a functional configuration of the access point 30, a general Wi-Fi (trade name) access point, a Wi-Fi (trade name) router, a mobile Wi-Fi (trade name) router, or the like that is distributed in the market can be used, and thus description thereof is omitted here.

1.5 Processing Flow

Figure 4:
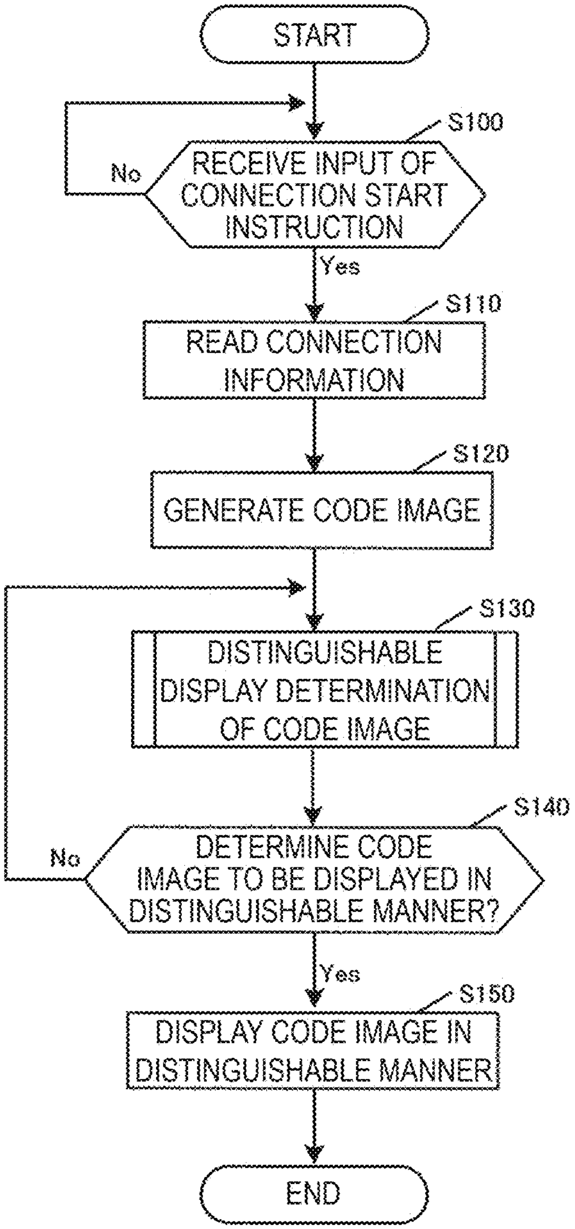
FIG. 4 is a flowchart explaining a processing flow according to the first embodiment.

Next, a processing flow according to the first embodiment will be described. FIG. 4 is a flowchart showing the processing flow from when a connection start instruction is received from the user of the terminal device 20 to when the multifunction peripheral 10 performs distinguishable display of a code image. The processing explained in FIG. 4 will be described on the assumption that the controller 11 of the multifunction peripheral 10 has read the connection setting program 193 and set the connection setting and the connection information related to the access point in advance. In addition, the processing explained in FIG. 4 is processing executed when the controller 11 of the multifunction peripheral 10 reads the code image generation program 194, the code image display control program 195, and the like.

First, the controller 11 determines whether an input of a connection start instruction has been received from the user of the terminal device 20 (step S100). In the processing of step S100, the controller 11 can determine whether the input of the connection start instruction has been received by determining whether the user has selected the connection start button, not illustrated, or the like displayed on the display 13 (operation inputter 15).

If it is determined that the input of the connection start instruction has been received from the user, the controller 11 reads the connection information related to the access point from the setting information storage area 196 (step S100: Yes, and progress to step S110). If it is determined that the input of the connection start instruction has not been received from the user, the controller 11 waits until a corresponding connection instruction is input (step S100: No).

Next, the controller 11 generates a code image by encoding the read connection information (step S120).

Then, the controller 11 performs distinguishable display determination of the generated code image (step S130). The processing of the distinguishable display determination of the code image in step S130 will be described using the next drawing.

The controller 11 determines whether the code image to be displayed in a distinguishable manner has been determined, based on the distinguishable display determination in step S130 (step S140). If it is determined that no code image to be displayed in a distinguishable manner has been determined, the controller 11 returns the processing to step S130 (step S140: No, and progress to step S130).

On the other hand, if it is determined that a code image to be displayed in a distinguishable manner has been determined, the controller 11 performs distinguishable display of the determined code image and ends the processing (step S140: Yes, and progress to step S150).

Figure 5:
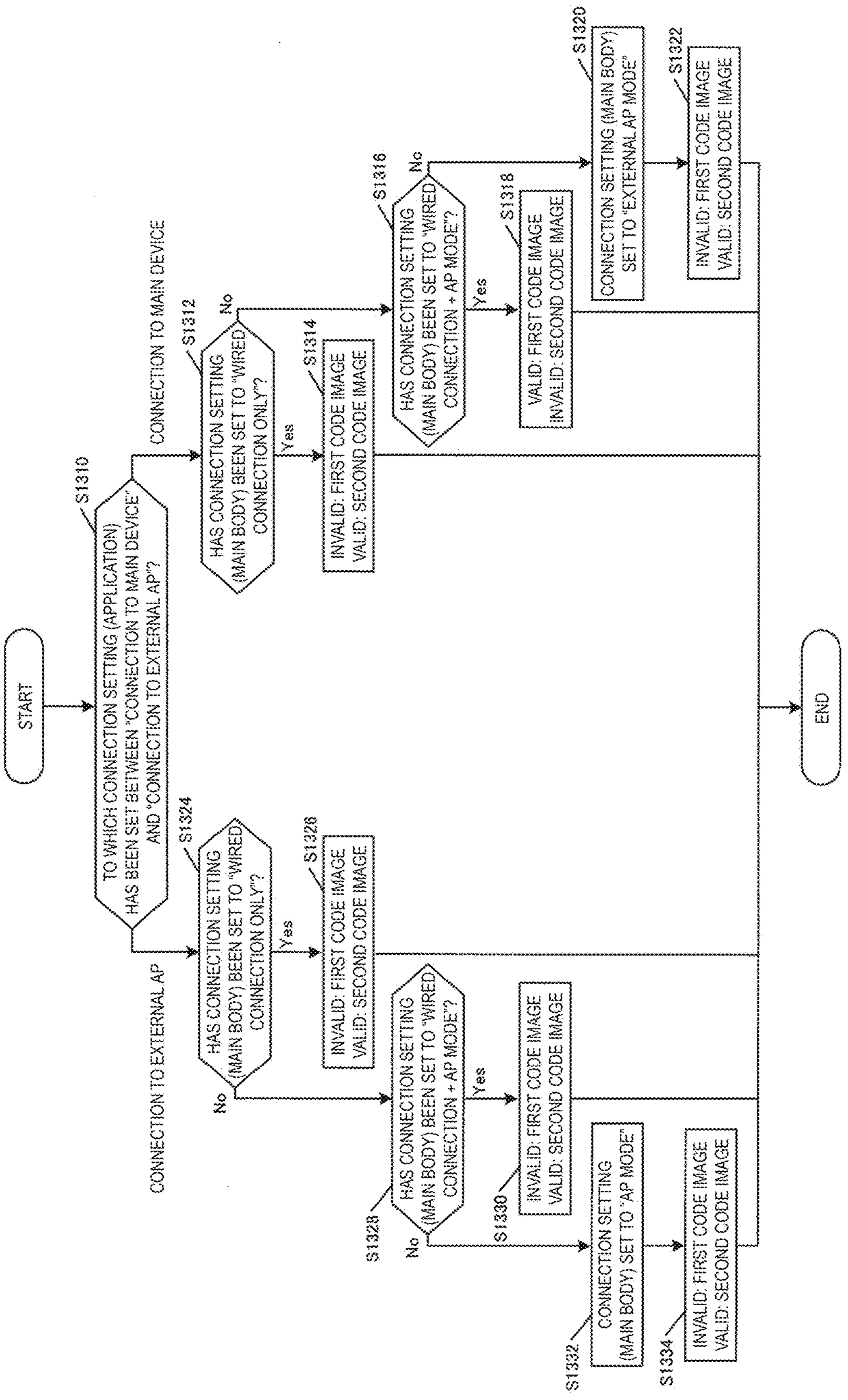
FIG. 5 is a flowchart explaining a processing flow according to the first embodiment.

Next, the processing of the distinguishable display determination for the code image in step S130 of FIG. 4 will be described using the flowchart of FIG. 5. In the flowchart of FIG. 5, a code screen which has a discrepancy in setting between the connection setting (main body) and the connection setting (application) and is to be a display target for the error screen (W102) in the related art is referred to as an invalid code image, and a code image which has no discrepancy in setting between the connection setting (main body) and the connection setting (application) and is not a display target for the error screen (W102) is referred to as a valid code image.

The controller 11 according to the disclosure performs control such that an invalid code image which is a display target for the error screen (W102) is displayed on the same screen as a valid code screen set to be valid. In this case, the controller 11 performs display control such that the valid code image and the invalid code image can be distinguished from each other.

When starting the processing of step S130, the controller 11 determines to which mode the connection setting (application) has been set between "connection to the main device" and "connection to the external AP" (step S1310). If it is determined that the connection setting (application) has been set to "connection to the main device", the controller 11 determines whether the connection setting (main body) has been set to "wired connection only" (step S1310 "connection to main device", and progress to step S1312).

If it is determined that the connection setting (main body) has been set to "wired connection only", the controller 11 determines that the first code image including the connection information for connecting the terminal device 20 to the access point of the multifunction peripheral 10 is an invalid code image and the second code image including the connection information for connecting the terminal device 20 to an access point other than the multifunction peripheral 10 is a valid code image, and ends the processing (step S1312: Yes, and progress to step S1314).

On the other hand, if it is determined that the connection setting (main body) has not been set to "wired connection only", the controller 11 determines whether the connection setting (main body) has been set to "wired connection+AP mode" (step S1312: No, and progress to step S1316).

If it is determined that the connection setting (main body) has been set to "wired connection+AP mode", the controller 11 determines that the first code image is a valid code image and the second code image is an invalid code image, and ends the processing (step S1316: Yes, and progress to step S1318).

On the other hand, if it is determined that the connection setting (main body) has not been set to "wired connection+ AP mode", the controller 11 determines that the connection setting (main body) is "external AP mode" (step S1316: No, and progress to step S1320). Then, the controller 11 determines that the first code image is an invalid code image and the second code image is a valid code image, and ends the processing (step S1322).

If it is determined that the connection setting (application) has been set to "connection to the external AP", the controller 11 determines whether the connection setting (main body) has been set to "wired connection only" (step S1310 "connection to external AP", and progress to step S1324).

If it is determined that the connection setting (main body) has been set to "wired connection only", the controller 11 determines that the first code image is an invalid code image and the second code image is a valid code image, and ends the processing (step S1324: Yes, and progress to step S1326).

On the other hand, if it is determined that the connection setting (main body) has not been set to "wired connection only", the controller 11 determines whether the connection setting (main body) has been set to "wired connection+AP mode" (step S1324: No, and progress to step S1328).

If it is determined that the connection setting (main body) has been set to "wired connection+AP mode", the controller 11 determines that the first code image is an invalid code image and the second code image is a valid code image, and ends the processing (step S1328: Yes, and progress to step S1330).

On the other hand, if it is determined that the connection setting (main body) has not been set to "wired connection+ AP mode", the controller 11 determines that the connection setting (main body) is "external AP mode" (step S1328: No, and progress to step S1332). Then, the controller 11 determines that the first code image is an invalid code image and the second code image is a valid code image, and ends the processing (step S1334). When the controller 11 determines that the connection setting (application) has been set to "connection to the external AP" in step S1310, the controller 11 may determine that the first code image is an invalid code image and the second code image is a valid code image, and omit the processing of step S1324 and subsequent processing, or the like to simplify the processing.

1.6 Operation Example

Figure 6:
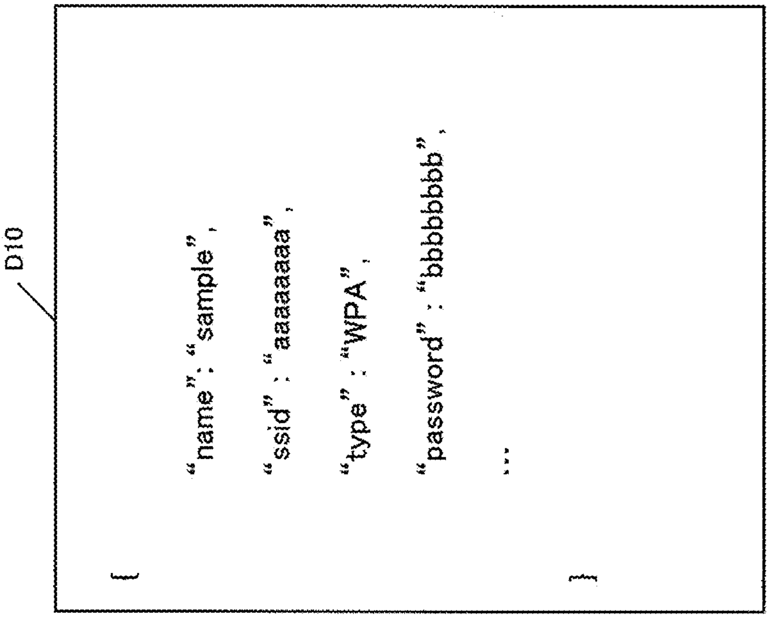
FIG. 6 is a diagram for describing an example of a data format of a code image.

Next, an example of operation according to the first embodiment will be described. FIG. 6 is a diagram illustrating an example of a data format of a code image (QR code (trade name)) generated as the first code image or the second code image.

In data D10 illustrated in FIG. 6, parameters (keys and key values) described in JavaScript Object Notation (JSON) format are embedded in a code image. In the first embodiment, although the first code image and the second code image are displayed on the same screen, the data formats of the parameters included in these code images are the same format, and the key values of parameters (keys: "name", "ssid", "type" (encryption type), "password", etc.) for allowing connection to the set access point are different between the first code image (the access point of the multifunction peripheral 10) and the second code image (an external access point such as the access point 30).

Figure 7:
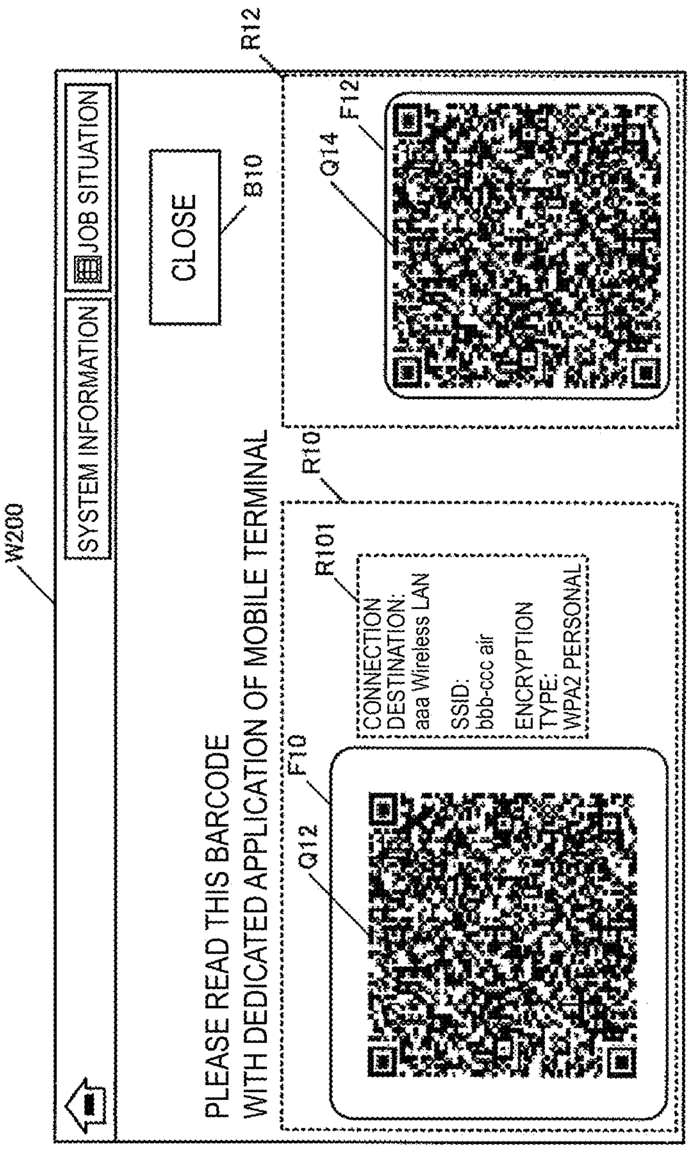
FIG. 7 is a diagram for describing an operation example according to the first embodiment.

FIG. 7 is a diagram for describing an example of a display configuration of an operation screen W200 displaying the first code image and the second code image. FIG. 7 is an operation example corresponding to the processing of distinguishable display of the code image in step S150 in FIG. 4. The operation screen W200 is also a reading screen on which the user reads the code image through the imaging unit 31 of the terminal device 20.

The operation screen W200 includes a notification "Please read this barcode with the dedicated application of the mobile terminal." for prompting the user to read the code screen with the terminal device 20, a close button B10, a valid code image display area R10, and an invalid code image display area R12.

The close button B10 is a button for receiving an instruction to end display of the operation screen W200.

The valid code image display area R10 provided on the left side of the operation screen W200 in the drawing is a display area displaying the first code image or the second code image determined to be a valid code image, based on the distinguishable display determination of the code image in step S130 (FIG. 5) of FIG. 4. For example, in step S1318 of FIG. 5, when it is determined that the first code image is a valid code image as the code image displaying the connection information of the access point, the controller 11 displays the first code image as a valid code image Q12 in the valid code image display area R10. At this time, in the valid code image Q12, a frame image F10 forming a display frame of the valid code image Q12 is displayed as an additional image. In addition, the valid code image display area R10 may be provided with a connection information display area R101 for displaying connection information (e.g., connection destination: aaa Wireless LAN, SSID: bbb-ccc air, encryption type: WPA2 personal) included in the code image.

The invalid code image display area R12 provided on the right side of the operation screen W200 in the drawing is a display area displaying the first code image or the second code image determined to be an invalid code image based on the distinguishable display determination of the code image in step S130 (FIG. 5) of FIG. 4. For example, in step S1318 of FIG. 5, when it is determined that the second code image is an invalid code image as the code image displaying the connection information of the access point, the controller 11 displays the second code image as an invalid code image Q14 in the invalid code image display area R12. At this time, in the invalid code image Q14, a frame image F12 forming a display frame of the invalid code image Q14 is displayed as an additional image.

As illustrated in FIG. 7, in the first embodiment, the display size of the code image is constant, and the valid code image Q12 (e.g., the first code image) and the invalid code image Q14 (e.g., the second code image) are displayed in a distinguishable manner based on the size of the displayed frame image representing the display frame around the code image. The user can easily identify any one of the valid code image and the invalid code image by visually recognizing the sizes of the displayed frame images F10 and F12 of the code images, in addition to the valid code image display area R10 (left side) or the invalid code image display area R12 (right side) arranged at different arrangement positions (display positions) on the operation screen W200.

Figure 8:
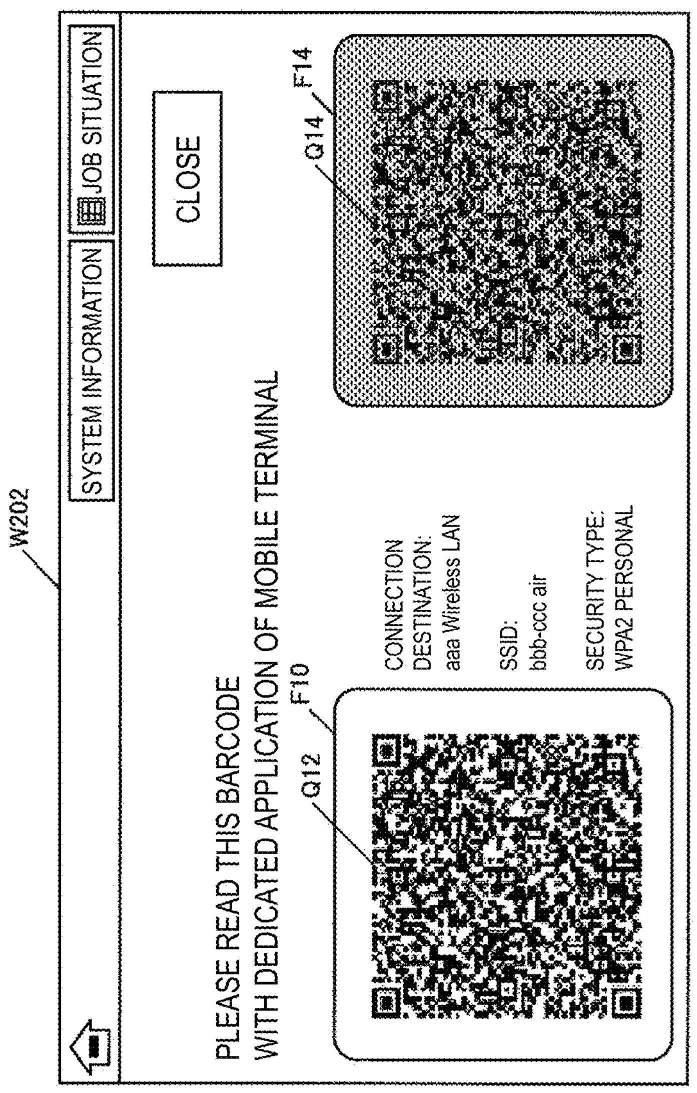
FIG. 8 is a diagram for describing an operation example according to the first embodiment.

FIG. 8 is a diagram for describing an example of a display configuration of another operation screen W202 displaying the first code image and the second code image. FIG. 8 illustrates an example in which the frame image F14 of the invalid code image Q14 is provided with a specific background color or shading to enable easy distinction from the valid code image Q12. Although FIG. 8 illustrates the frame image F10 and the frame image F14 at the same display size, the display sizes of the frame image F10 and the frame image F14 may have a magnitude relationship similar to that depicted in FIG. 7.

Figure 9:
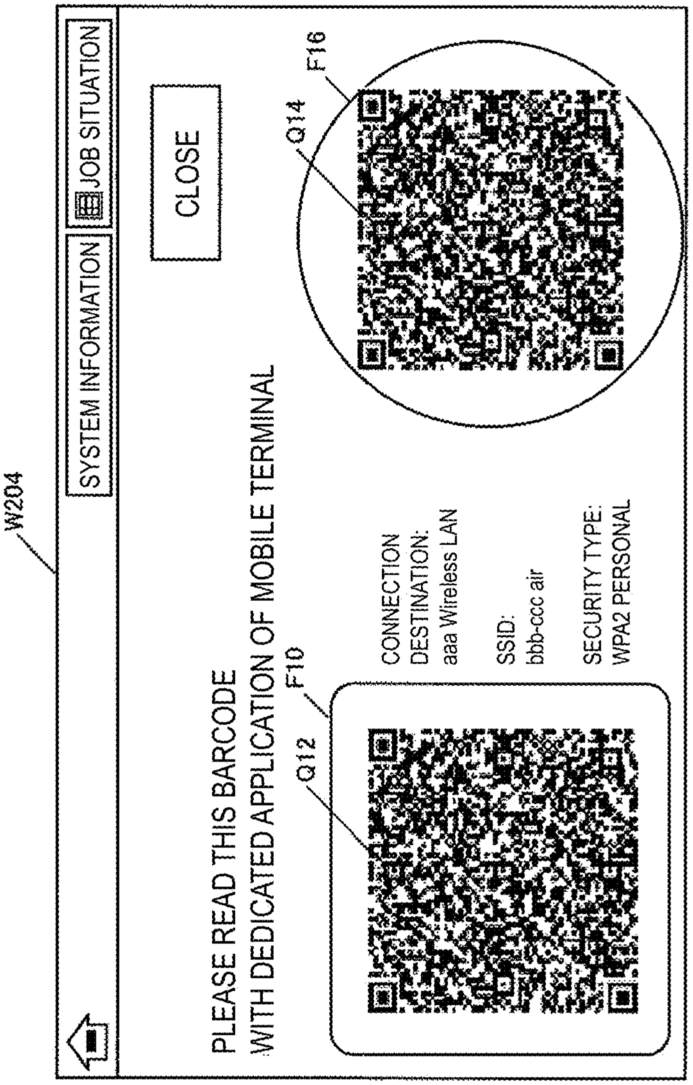
FIG. 9 is a diagram for describing an operation example according to the first embodiment.

FIG. 9 is a diagram for describing an example of a display configuration of another operation screen W204 displaying the first code image and the second code image. FIG. 9 illustrates an example in which the shape of the frame image F16 of the invalid code image Q14 is a shape (for example, a round shape) different from the shape of the frame image F10 of the valid code image Q12. The shape of the frame image F16 may be any shape as long as the shape can be distinguished from the frame image F10. For example, the shape of the frame image F16 may be a specific polygonal shape other than a quadrangle such as a triangle, a pentagon, or a star shape, and the frame line may be represented by a specific line type such as a dotted line or a one dot chain line.

Figure 10:
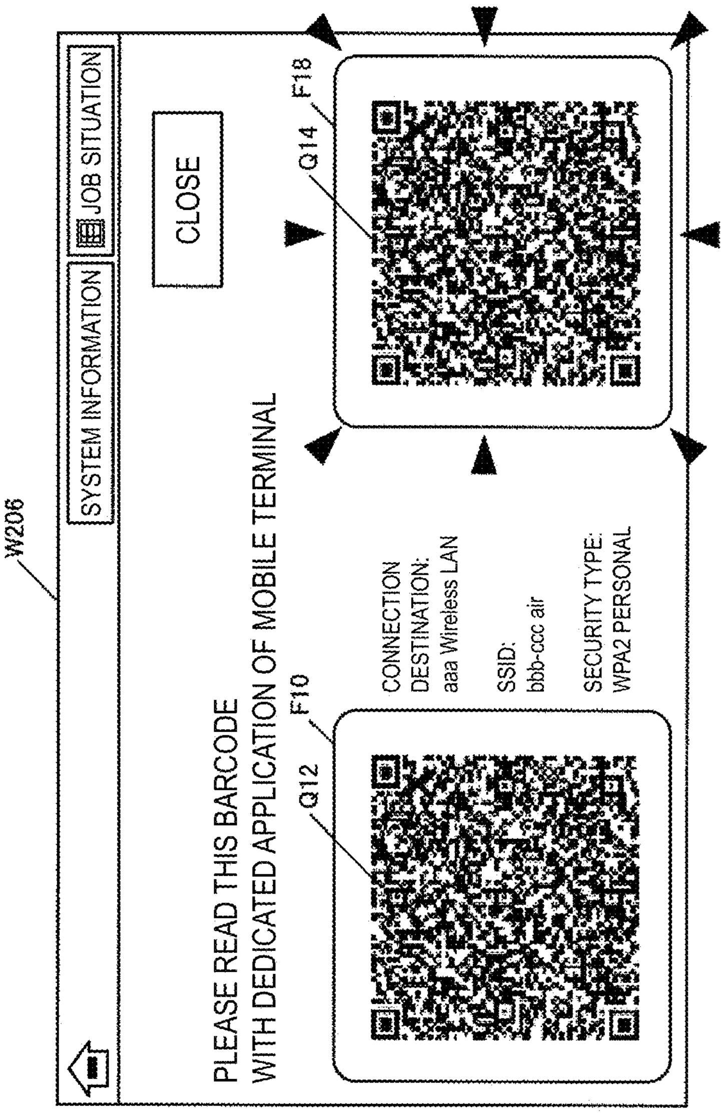
FIG. 10 is a diagram for describing an operation example according to the first embodiment.

FIG. 10 is a diagram for describing an example of a display configuration of another operation screen W206 displaying the first code image and the second code image. FIG. 10 illustrates an example in which a frame image F18 of the invalid code image Q14 is displayed in a blinking manner. In this case, the invalid code image Q14 may be set to blink alongside the blinking display of the frame image F18. Although the blinking cycle, the blinking color, and the like of the frame image F18 are not particularly limited, the display may be controlled such that the blinking cycle or the blinking color is changeable during display.

Although an example in which the valid code image and the invalid code image are displayed in a distinguishable manner based on the display form of the frame images F12 to F18 added to the invalid code image Q14 has been described in FIGS. 7 to 10, the valid code image and the invalid code image may be distinguished from each other by changing the display form of the frame image F10 added to the valid code image Q12, or the display form of the frame images added to both code images may be changed.

Figure 11A:
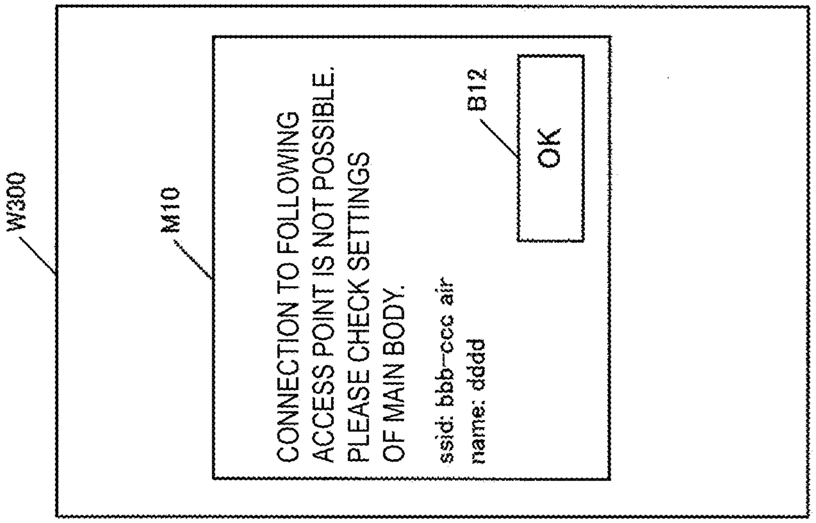
FIGS. 11A and 11B are diagrams for describing operation examples according to the first embodiment.
Figure 11B:
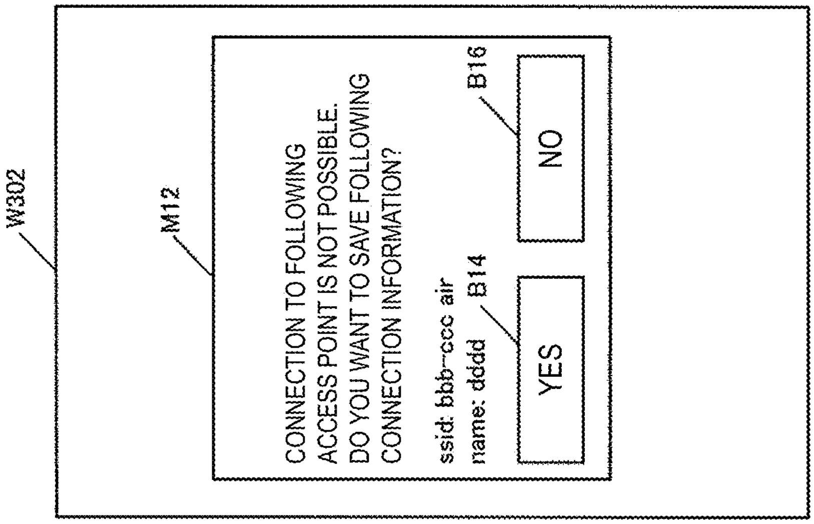

FIGS. 11A and 11B are diagrams for describing examples of a display configuration of the connection result screen when the terminal device 20 reads the first code image or the second code image determined to be an invalid code image. In the disclosure, even when the first code image or the second code image determined to be an invalid code image is read, the controller 21 of the terminal device 20 tries to wirelessly connect to the access point analyzed based on the decoding result (analysis result) of the corresponding code image.

In this case, since the wireless connection fails, the controller 21 displays a connection result screen W300 illustrated in FIG. 11A on the display 23. The connection result screen W300 includes a notification display area M10 for notifying the user of the fact that a wireless connection to the access point based on the read code image has failed. The notification display area M10 includes a notification detailing "Connection to the following access point is not possible. Please check the settings of the main body.", connection information (ssid: bbb-ccc air, name: dddd) of the access point to which a wireless connection has been attempted, and an OK button B12.

The OK button B12 is a button for receiving selection of a confirmation instruction indicating that the wireless connection to the access point indicated by the connection information has failed. When an instruction to select the OK button B12 is received from the user, the controller 21 ends the display of the connection result screen W300.

Even if a wireless connection to the access point fails, the connection information for the access point can be saved (registered). FIG. 11B is for an example of a display configuration of a connection result screen W302 capable of storing decoded connection information regardless of whether a connection to the access point, based on the first code image or the second code image is successful.

The connection result screen W302 includes a notification display area M12 for notifying the user of the fact that a wireless connection to the access point, based on the read code image has failed. The notification display area M12 includes a notification detailing "Connection to the following access point is not possible. Do you want to save the following connection information?", connection information (ssid: bbb-ccc air, name: dddd) of the access point to be saved, a YES button B14, and a NO button B16.

The YES button B14 is a button for receiving an instruction to save the connection information of the access point to be saved. When an instruction to select the YES button B14 is received from the user, the controller 21 saves (stores) the connection information in the setting information storage area 295 of the storage 29. The NO button B16 is a button for receiving an instruction to discard the connection information of the access point to be saved. Upon receiving an instruction to select the NO button B16 from the user, the controller 21 discards the connection information and ends the processing.

According to the first embodiment, the display can display the first code image including the connection information for the terminal device to connect to the multifunction peripheral serving as an access point and the second code image including the connection information for the terminal device to connect to an access point other than the multifunction peripheral regardless of whether the function of the multifunction peripheral as an access point is enabled or disabled as described above. Also, connection information about an access point can be saved (registered) without requiring confirmation and resetting of the settings for the main body of the multifunction peripheral by the administrator even when there is a discrepancy between the connection setting (main body) and the connection setting (application) and a wireless connection to the access point fails. Thereby the user operability with respect to acquisition of connection information for a connection to an access point can be improved.

2 Second Embodiment

In the first embodiment, the valid code image Q12 (e.g., the first code image) and the invalid code image Q14 (e.g., the second code image) are displayed in a distinguishable manner, based on the display forms of the frame images forming the display frames of the code images. A second embodiment is a form in which the valid code image Q12 and an invalid code image Q16 can be displayed in a distinguishable manner, based on the display sizes of the valid code image Q12 and the invalid code image Q16.

Since functional configurations of the multifunction peripheral 10, the terminal device 20, and the access point 30, and the processing flow according to the second embodiment can be similar to those in the first embodiment, description thereof will be omitted here.

Figure 12:
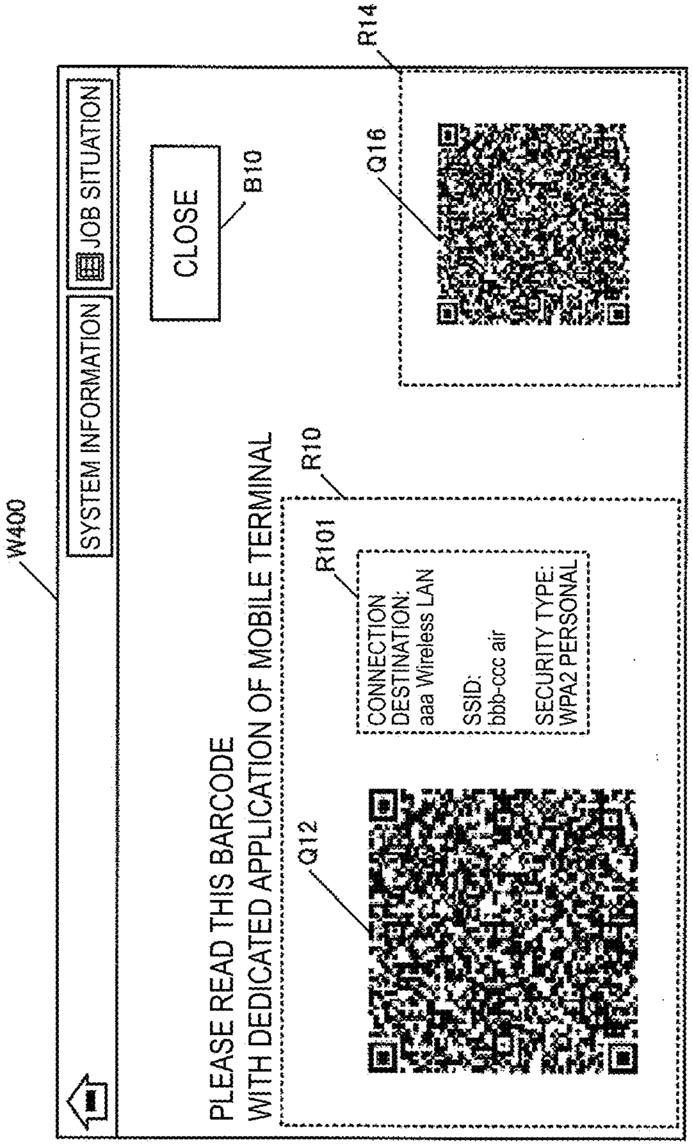
FIG. 12 is a diagram for describing an operation example according to a second embodiment.

FIG. 12 is a diagram for describing an example of a display configuration of an operation screen W400 displaying a first code image and a second code image according to the second embodiment. The same configurations as those of the operation screen W200 and the like illustrated in FIG. 7 and the like of the first embodiment are denoted by the same reference symbols, and description thereof will be omitted.

As illustrated in FIG. 12, in an invalid code image display area R14 provided on the right side of the operation screen W400 in the drawing according to the second embodiment, the invalid code image Q16 having a smaller display size than the valid code image Q12 displayed in the valid code image display area R10 is displayed in a distinguishable manner. In this case, the invalid code image Q16 may be displayed in a display color different from that of the valid code image Q12.

As described above, the second embodiment is effective when the display size of the operation screen is limited or when it is intended to simplify the operation screen, in addition to the effects of the first embodiment.

The disclosure is not limited to the above-described embodiments, and various modifications are possible. In other words, the technical scope of the disclosure also includes embodiments obtained by combining technical means that are appropriately modified within the scope of the gist of the disclosure.

Further, although the above-described embodiments are described separately for convenience of description, it is obvious that the embodiments may be executed in combination within a technically possible scope.

Further, in the embodiment, a program operating on each device is a program that controls a CPU or the like (a program for causing a computer to function) to realize the functions of the above-described embodiment. In addition, information handled by these devices is temporarily accumulated in a transitory storage device (e.g., a RAM) at the time of processing, is then stored in a storage device such as any of various ROMs or HDDs, and is read, corrected, and written by the CPU as needed.

Here, a computer-readable non-transitory recording medium on which the program is recorded in the information processing device may be any of a semiconductor medium (for example, a ROM or a non-volatile memory card), an optical recording media/magnetic optical recording medium (for example, a digital versatile disc (DVD), magneto optical disc (MO), mini disc (MD), compact disc (CD), Blu-ray ((BD; trade name) disc), or the like), a magnetic recording medium (for example, a magnetic tape or flexible disk), and the like. In this case, the program recorded on the recording medium is read by the computer of the information processing device and executed by the computer, so that not only the functions of the above-described embodiments are realized, but also functions of the disclosure are realized by performing processing in cooperation with an operating system, another application program, or the like, based on instructions of the program.

Further, when a program is distributed in the market, the program can be stored in a portable recording medium and distributed, or can be transferred to a server computer connected via a network such as the Internet. In this case, it is obvious that a storage device of the server computer is also included in the disclosure.

Further, each functional block or feature of the device used in the above-described embodiments can be implemented and executed by an electric circuit, such as an integrated circuit or a plurality of integrated circuits. The electric circuit designed to realize the functions described herein may include a general-purpose processor, a digital signal processor (DSP), an application-specific integrated circuit (ASIC), a field programmable gate array (FPGA), another programmable logic device, a discrete gate or transistor logic, a discrete hardware component, or a combination thereof. The general-purpose processor may be a microprocessor, or any known processor, controller, microcontroller, or state machine. The electric circuit described above may consist of a digital circuit or may consist of an analog circuit. Further, when an integrated circuit technology for replacement into a current integrated circuit emerges with the development of semiconductor technology, a new integrated circuit based on the technology may also be used in one or more aspects of the disclosure.

While there have been described what are at present considered to be certain embodiments of the invention, it will be understood that various modifications may be made thereto, and it is intended that the appended claims cover all such modifications as fall within the true spirit and scope of the invention.

The invention claimed is:

1. An image processing apparatus that generates connection information, for a connection to an access point, as a code image that is readable by a terminal device, the image processing apparatus comprising:
  - a display that displays the generated code image; and
  - one or more controllers that control display of the generated code image on the display,
  - wherein the one or more controllers:
    - generate a first code image including first connection information for the terminal device to connect to the image processing apparatus which is serving as a first access point, and a second code image including second connection information for the terminal device to connect to a second access point other than the image processing apparatus, and
    - display the generated first code image and the generated second code image on the display, regardless of whether a function of the image processing apparatus serving as an access point is enabled or disabled.

2. The image processing apparatus according to claim 1, wherein the one or more controllers further display the generated first code image and the generated second code image in a distinguishable manner according to which of the first access point and second access point is set as a connection destination of the terminal device.

3. The image processing apparatus according to claim 2,
  - wherein an additional image is added to the generated code image and displayed on the display, and
  - the one or more controllers further display the generated first code image and the generated second code image in the distinguishable manner based on a display mode of the additional image.

4. The image processing apparatus according to claim 3,
  - wherein the additional image is a frame image forming a display frame of the generated code image, and
  - the one or more controllers further display the generated first code image and the generated second code image in the distinguishable manner based on a size of the frame image as the display mode of the additional image.

5. The image processing apparatus according to claim 4, wherein the one or more controllers further:

display the frame image added to the generated first code image to be larger than the frame image added to the generated second code image in a case that the connection destination of the terminal device is set to the first access point, and display the frame image added to the generated second code image to be larger than the frame image added to the generated first code image in a case that the connection destination of the terminal device is set to the second access point.

6. The image processing apparatus according to claim 4, wherein the one or more controllers further display the frame image added to the generated first code image and the frame image added to the generated second code image at different display positions.

7. A system comprising:

an image processing apparatus; and a terminal device capable of connecting to the image processing apparatus via an access point, wherein the image processing apparatus includes;

a generator that generates connection information, for a connection to the access point, as a code image, a display that displays the generated code image, and one or more controllers that control display of the generated code image on the display, wherein:

the one or more controllers:

generate, by controlling the generator, a first code image including first connection information for the terminal device to connect to the image processing apparatus which is serving as a first access point, and a second code image including second connection information for the terminal device to connect to a second access point other than the image processing apparatus, and display the generated first code image and the generated second code image on the display, regardless of whether a function of the image processing apparatus serving as an access point is enabled or disabled, and the terminal device includes:

a connection controller that:

reads the generated code image displayed on the display and connects to the first access point or the second access point based on decoded connection information, and stores the decoded connection information regardless of whether a connection to the first access point or the second access point, based on the generated first code image or the generated second code image, is successful.

8. A control method comprising:

generating connection information, for a connection to an access point, as a code image that is readable by a terminal device;

displaying the generated code image;

controlling display of the code image;

generating a first code image including first connection information for the terminal device to connect to an image processing apparatus serving as a first access point, and a second code image including second connection information for the terminal device to connect to a second access point other than the image processing apparatus; and displaying the generated first code image and the generated second code image regardless of whether a function of the image processing apparatus serving as an access point is enabled or disabled.

* * * * *